March 10, 1970    F. J. NESSLINGER ET AL    3,499,565
MATERIAL HANDLING APPARATUS Filed April 23, 1968    5 Sheets-Sheet 1

INVENTORS:
ARTHUR C. BORGMAN
FRITZ J. NESSLINGER

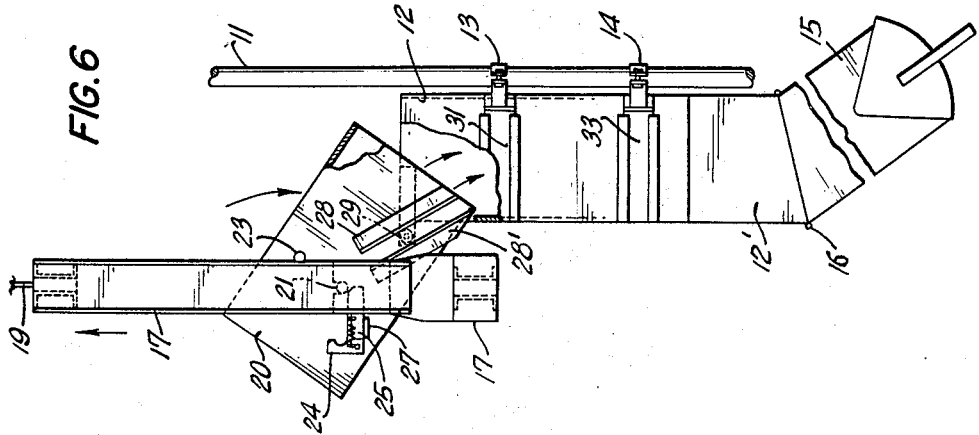
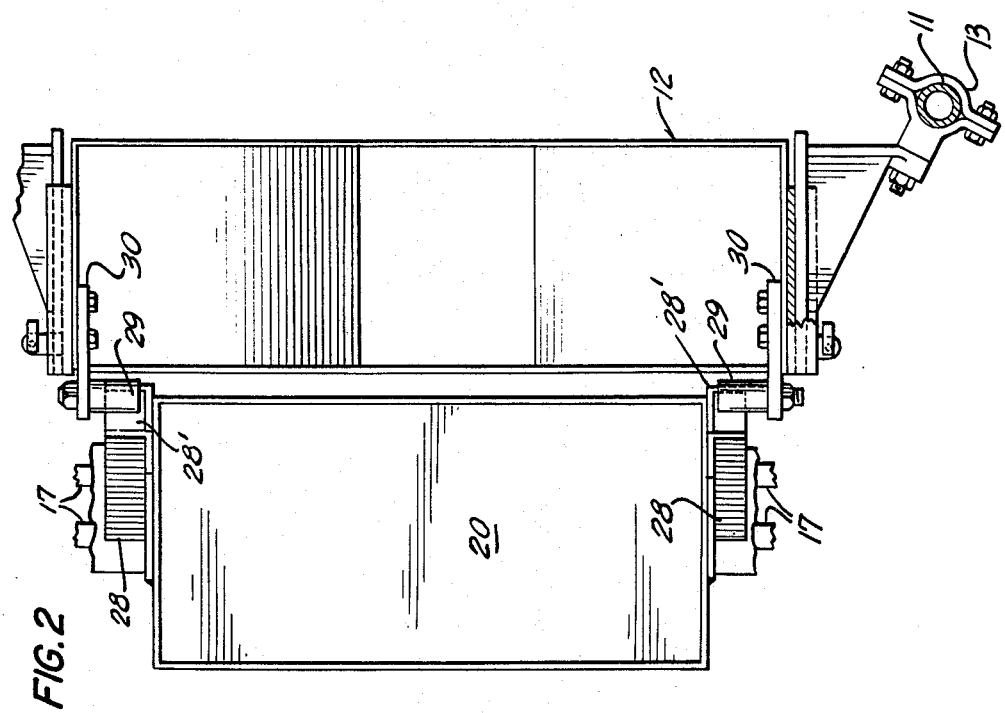

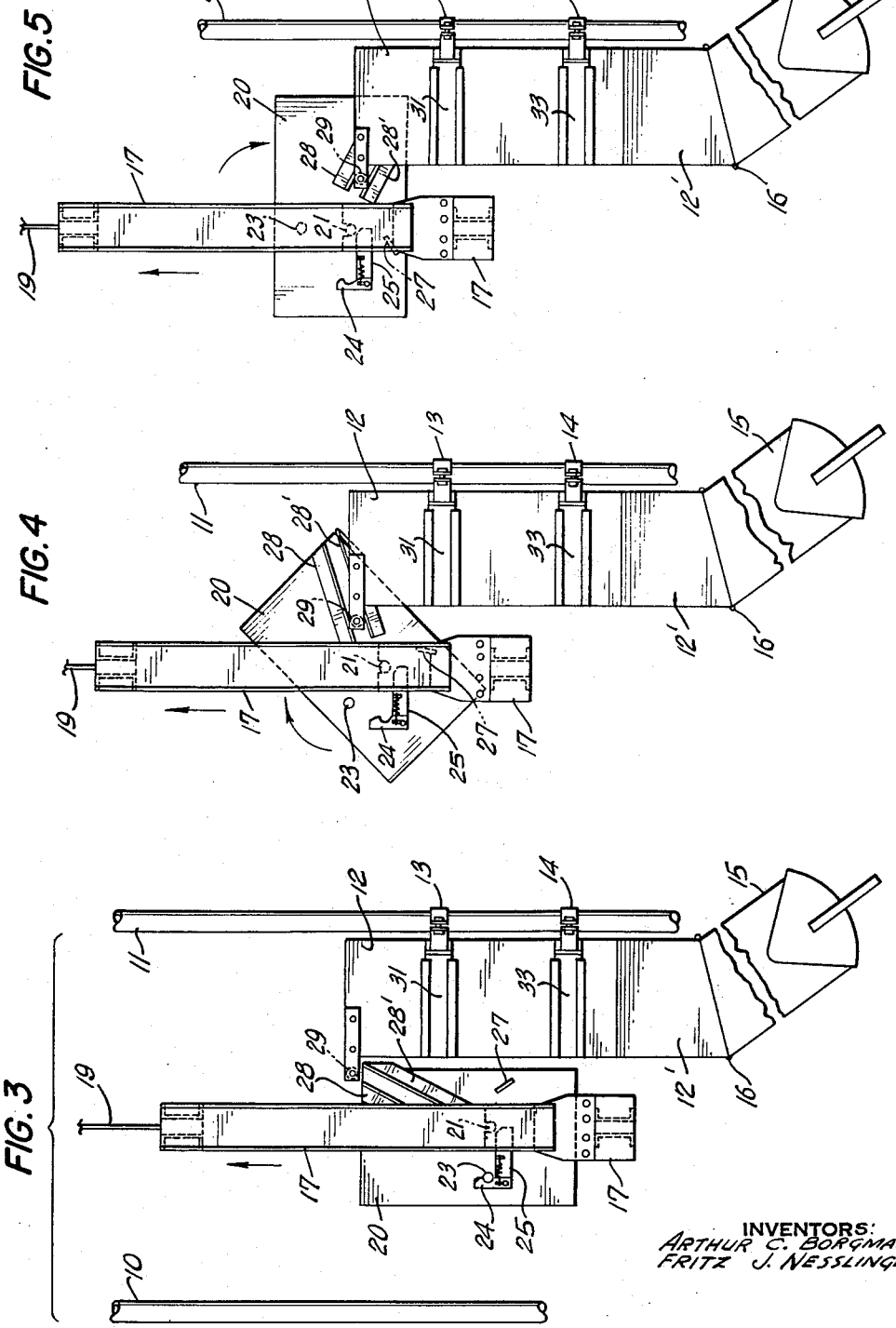

INVENTORS:
ARTHUR C. BORGMAN
FRITZ J. NESSLINGER

March 10, 1970  F. J. NESSLINGER ET AL  3,499,565
MATERIAL HANDLING APPARATUS
Filed April 23, 1968  5 Sheets-Sheet 5
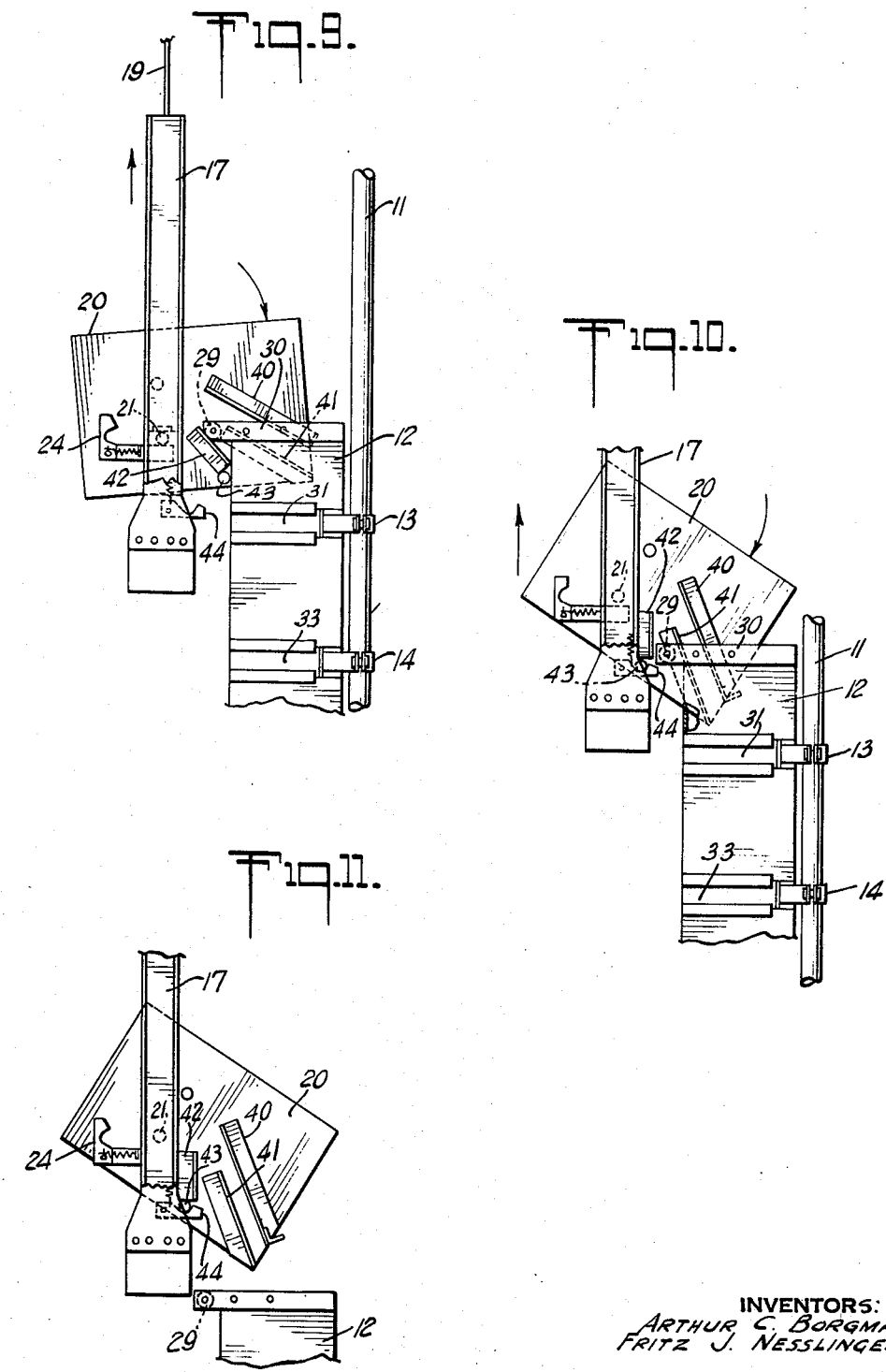
INVENTORS:
ARTHUR C. BORGMAN
FRITZ J. NESSLINGER United States Patent Office 3,499,565
Patented Mar. 10, 1970

3,499,565
MATERIAL HANDLING APPARATUS
Fritz J. Nesslinger, College Point, and Arthur C. Borgman, Franklin Square, N.Y., assignors to Harsco Corporation, Harrisburg, Pa., a corporation of Delaware
Continuation-in-part of application Ser. No. 621,310, Mar. 7, 1967, which is a continuation-in-part of application Ser. No. 524,803, Feb. 3, 1966. This application Apr. 23, 1968, Ser. No. 723,430
Int. Cl. B65g 47/16
U.S. Cl. 214—705                                    7 Claims

ABSTRACT OF THE DISCLOSURE

A skeleton type material hoisting tower includes a hopper releasably secured therein, and a cable supported bucket for carrying material to and automatically discharging it into the hopper by operative engagement of guides or cams on the bucket with tilting means, as rollers, on the hopper. In a modification, the guides on the bucket are arranged to disengage from the rollers on the hopper when the bucket over-runs its discharging position; and, in such case, re-engagement of the guides and rollers ensures effective return of the bucket to loading position.

This application is a continuation-in-part of our co-pending application Ser. No. 621,310 filed Mar. 7, 1967, now Patent No. 3,422,976, which, in turn, is a continuation-in-part of our copending application Ser. No. 524,-803 filed Feb. 3, 1966, now Patent No. 3,379,887.

The present invention relates to material handling apparatus.

Known apparatus for a similar purpose has included an open top hopper releasably secured at different positions vertically along a skeleton type tower and a bucket which, after loading, can be hoisted into position for automatically discharging its contents into the hopper. In some types of such apparatus, discharge of material, as concrete, into the hopper, is effected by relatively complex and power-consuming mechanisms; and in other forms, the contents of the bucket are retained during hoisting by a gate at its bottom end which, under some conditions, is difficult to operate or maintain in operative condition and which may unduly obstruct or limit free flow of the concrete from the bucket.

Accordingly, an object of the present invention has been to provide material handling apparatus which can readily be installed and effectively used in hoisting towers of conventional or other suitable skeleton type; to provide simpler and more enduring and reliable operating mechanisms for automatically releasing the contents of the bucket and more freely and rapidly discharging the same into the hopper; and for returning the empty bucket to its loading position.

In general, an embodiment of our invention includes an open top hopper, and open top bucket pivotally supported in a frame, means for raising and lowering said frame and the bucket in a tower advantageously by a constant torque motor, means arranged and adapted for automatically tilting said bucket into material discharging position in relation to the hopper and for returning it to load receiving condition, and means for releasably latching the bucket in said position automatically along with downward travel thereof. Said bucket tilting means includes spaced guide ways on the bucket and rollers mounted on the hopper in position for operative camming engagement with said guide ways during end portions of the travel of the bucket, thereby to tilt the latter to and from discharging position. Latch means operatively mounted between the bucket and the frame releasably lock the bucket in upright position in the frame during loading and travel.

In an embodiment wherein the hoisting cable is actuated by an engine or motor not of constant torque type or having equivalent power and control features, for example, the means for controlling tilting or discharge movement of the bucket advantageously includes guides on the bucket which are arranged to disengage from the rollers on the hopper when the bucket is raised beyond its discharge position thereby to avoid injury to said parts and others by said over-run.

Other objects and distinctive features of our invention not above referred to will appear from the following description and claims and in the accompanying drawings wherein we have shown a preferred embodiment of our herein described invention.

In the drawings:

FIG. 1 is a view generally in side elevation showing portions of uprgihts or posts of a quadrangular skeleton type tower, a hopper releasably secured thereon, a bucket supporting frame and means for raising and lowering said frame and bucket in relation to the hopper, an open top bucket pivotally mounted on the frame and means for tilting said bucket in one direction to discharge the contents thereof into the hopper and in the opposite direction for returning said bucket to upright or load receiving position, said raising and lowering means including a motor actuated cable;

FIG. 2 is a top plan view showing the open top ends of the hopper and the bucket;

FIG. 3 is a side elevation of the hopper and bucket showing the latter being moved upwardly toward discharge position;

FIG. 4 is a view similar to FIG. 3 with the bucket tilting devices operatively interengaged;

FIG. 5 is a view similar to FIG. 4 but with the bucket tilted to bring its open discharge end into the open receiving end of the hopper;

FIG. 6 is a view similar to FIG. 5 but with the bucket tilted to its discharging position;

FIG. 9 is a side elevation showing the relative positions of the parts as the open end of the bucket reaches discharge position;

FIG. 10 is a similar view showing the bucket in discharge position and with the rollers clear of the path of travel of guides on the bucket;

FIG. 11 is a side elevation showing the bucket after having passed upward beyond its discharge position as seen in FIG. 10 and prior to its return or downward course through the positions shown in sequence in FIGS. 10, 9, 8 and 7.

Figure 1:
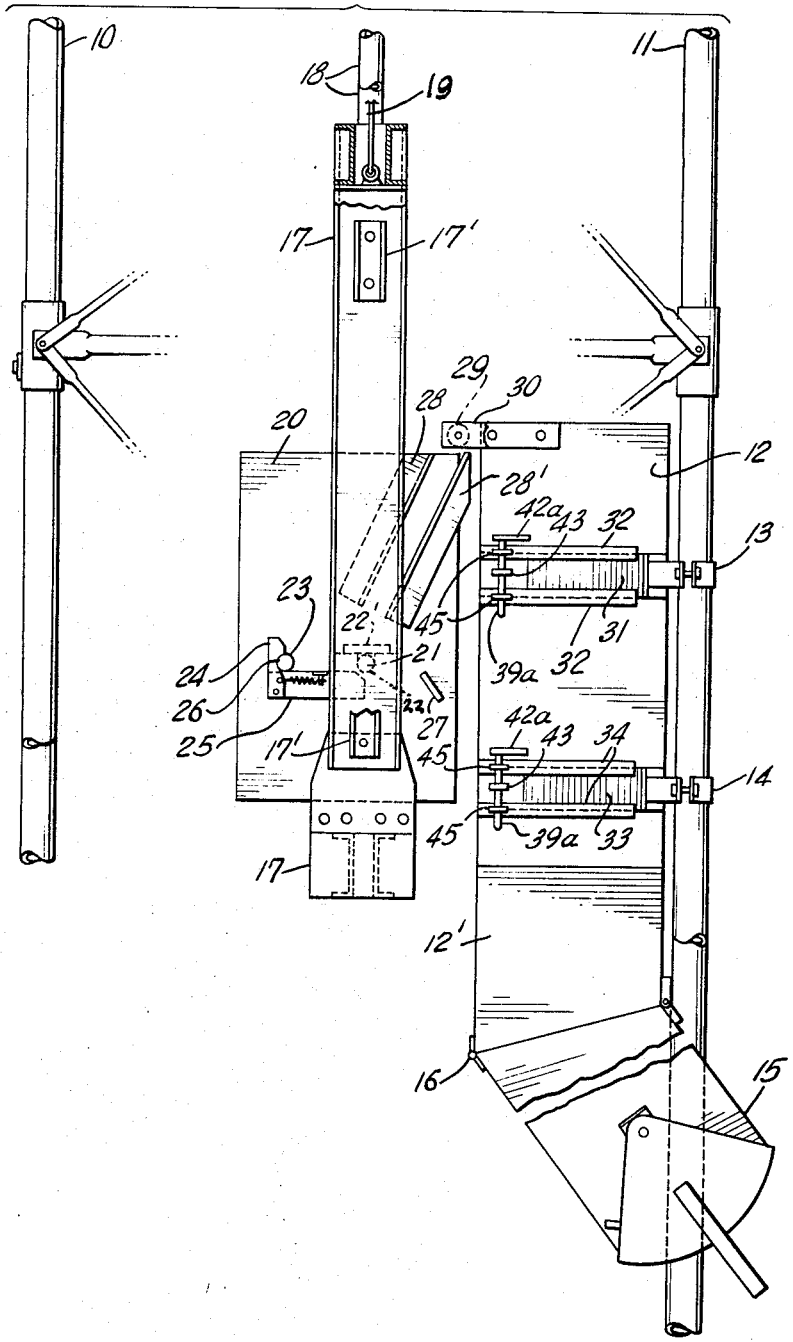

Referring to the drawings, apparatus embodying the present invention and adapted for handling concrete is advantageously mounted to operate in a skeleton type quadrangle tower represented in FIG. 1 by uprights or posts 10 at the left and 11 at the right. A concrete receiving hopper 12 and chute 12' assembly is releasably secured to posts 11 by clamps 13 and 14 engaging said posts. A discharge conduit 15 is hinged to the bottom end of chute 12'.

A frame 17 is guided on vertical tracks 18, one at each side of the tower, and is raised and lowered therein by a cable 19 and suitable hoisting engine or motor not shown, but advantageously in the embodiment shown in FIG. 1, comprising a constant torque engine or equivalent for more effective control.

Said frame 17 mounts a concrete carrying open top bucket 20 pivoted therein to tilt toward and from hopper 12, said bucket having trunnions 21 supported in bearing notches 22 in said frame 17 where it may be retained by suitable keepers 22′ extending across said notches 22. Said frame 17 is raised in normal operation by said cable 19 to carry supplies of concrete or the like in bucket 20 upwardly from a load receiving lower position and to discharge the same into the open upper end of said hopper 12 and thence through chute 12′ and hinged conduit 15.

Bucket 20 is advantageously mounted to tilt in frame 17 between its upright position, as seen in FIGS. 1 and 3 and its discharge position, as seen in FIG. 6. Means are provided to releasably maintain said bucket in said upright position during vertical travel in the tower and at its filling or loading position therein. For this purpose, each of the side walls of bucket 20 is provided with a stud 23, FIG. 1, positioned to interengage with a spring biased latch 24 pivoted on a bracket 25 carried by a side member of frame 17. Thus, as seen in FIG. 1, when bucket 20 is in upright position in frame 17, said stud 23 engages in a detent notch 26 formed in a lateral edge of latch 24 which is chamfered at its upper end to facilitate automatic latching when the bucket is tilted counterclockwise from discharge to upright position in frame 17. Notch 26 is advantageously of curved contour which facilitates automatic latching and unlatching of stud 23 from latch 24 when the bucket 20 is tilted from and toward its discharge position.

Stops 27, one at each side of bucket 20, are positioned to operatively engage under-edge portions of brackets 25, thereby to limit the extent of tilting or angular movement of said bucket and to steady the same in discharge position.

To effect tilting automatically in moving to and from discharge position, each side of the bucket is provided with spaced parallel guides, as channels 28 and 28′. As seen in FIG. 1, the upper end of each channel 28′ extends slightly beyond the adjacent vertical edge of bucket 20 and in a direction to come into operative camming engagement with rollers 29 mounted on fixed brackets 30 which project from hopper 12 toward the path of movement of said bucket.

Under some operating conditions, however, as where the loaded bucket is raised rapidly with only limited or inadequate speed control, it may be carried through and beyond the dumping position, FIG. 10, to a higher level, FIG. 11. In such case, unless the guides on the bucket readily disengage from rollers 29 on the hopper, such over-run of the bucket would bring the guides into jamming engagement with the rollers thereby causing damage to the interengaged parts and others. Accordingly, as seen in FIGS. 7 through 11, said parts are advantageous so arranged that guides 40, 41 on the bucket are disengaged from said rollers with upward travel of the bucket beyond its dumping position, as seen in FIG. 10.

In the modification, FIGS. 7 through 11, provision is made, more especially where hoisting is effected by an engine other than one of constant torque type or having equivalent controls, for permitting bucket 20 to freely by-pass or over-run its discharge position, FIG. 10, without damage to the apparatus and ensure its unimpeded return to loading position in case the operator should permit such over-run or upward travel beyond said discharge position or to such extent that the guides tend to be moved out of and beyond camming engagement with the rollers.

For such purpose, and, as seen in FIGS. 7 through 11, guides 40, 41 and 42 on bucket 20 engage the rollers 29 on brackets 30 of hopper 12, thereby, in normal operation, causing the bucket to tilt when it is raised and lowered and to discharge its contents at the position shown in FIG. 10. Said spaced parallel main guides 40 and 41 on each side of the bucket are arranged advantageously at an angle of approximately 35° to the vertical or to the axis of the travel path of the bucket.

Figure 7:
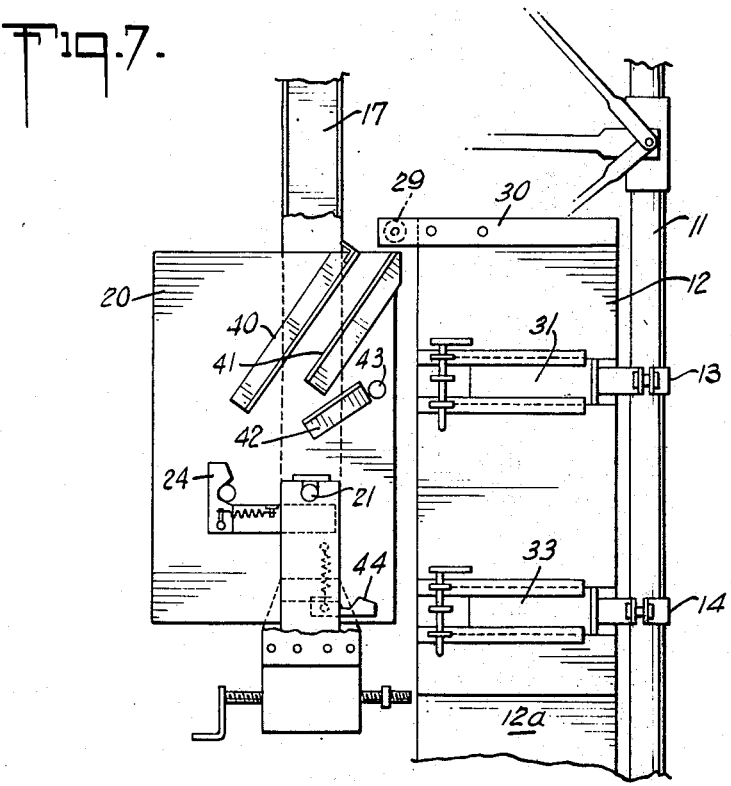
FIG. 7 is a side elevation of a modification wherein the tilting devices are arranged to permit the over-run of the bucket past its discharge position in relation to the hopper, the parts being shown in their relative positions during upward travel of the bucket prior to engagement of guide means on the bucket with tilting rollers on the hopper.

It is noted that lower guides 41 are shorter than upper guides 40 so that, as bucket 20 moves in upward travel from FIG. 7 position to FIG. 10 position, the inner ends of said lower guides come clear of rollers 29, FIG. 9. At this point, further upward movement of bucket 20 brings supplemental guides 42 into position to engage rollers 29 and thus to further tilt bucket 20 to its effective discharge position, FIG. 10, where its angular movement is normally arrested by engagement of lugs 43 with spring pressed stops 44 extending laterally from its sides.

If, however, bucket 20 is carried up beyond discharge position from FIG. 10 to FIG. 11 position, for example, the guides thereon moves freely past rollers 29 with no injury thereto or to adjoining structure.

Figure 8:
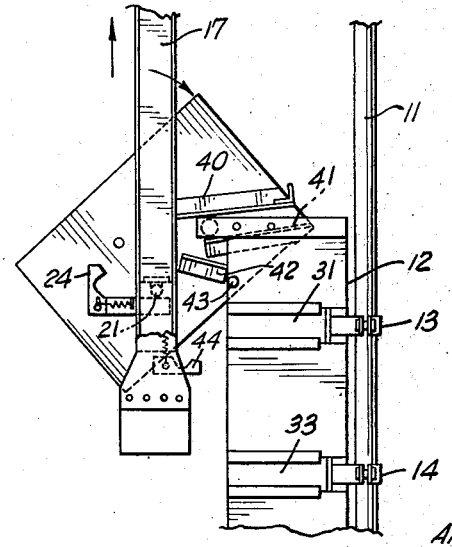
FIG. 8 is a side elevation of the apparatus of FIG. 7 with the tilting parts operatively interengaged.

It will be apparent that on return of the bucket toward loading position, the tilting guides thereon will re-engage rollers 29 at about the position seen in FIG. 9; and, on continued return travel, will in turn, through the phases seen in FIGS. 7 and 8, cause the bucket to tilt back counter-clockwise to its upright position as seen in FIG. 7.

In a normal cycle of operation of the apparatus shown in FIGS. 7 through 11, when frame 17 and the loaded bucket are hoisted to the discharge position, FIG. 10, the next increment of upward movement will bring the guides on bucket 20 into operative engagement with the rollers on the hopper. The angle of the guide axis is such that, as frame 17 continues to be raised higher by cable 19, the bucket is tilted through a cycle of positions substantially as above described. At the discharge position, stops on the bucket arrest angular or tilting movement and the bucket load is emptied into hopper 12. By reversing the hoisting mechanisms, bucket 20 is returend to loading condition and position.

We claim:

1. Material handling apparatus wherein a bucket open at its top end is mounted in a hoisting tower in operative relation to a hopper which is open at its top end and means including a frame carried on a hoisting cable are provided for supporting and vertically moving said bucket from and toward load receiving position and toward and from load discharging position in relation to said hopper, said bucket being pivotally mounted and tiltable in said frame toward and from said hopper when in load receiving position, said apparatus including the improvement which comprises bucket tilting devices cooperatively arranged on and between the bucket and the hopper and including roller guiding means on the bucket and rollers mounted on and extending from the hopper toward the path of vertical movement of said guiding means on the bucket, stop means cooperatively arranged between the bucket and the frame for limiting the extent of tilting movement of the bucket, and latch means operatively interposed between the bucket and the frame whereby the bucket is releasably retained in load receiving and load carrying relation to the frame, other latch means on the frame, and a second stop on the bucket positioned to be engaged by said other latch means whereby the bucket is releasably retained in load discharging relation to the hopper.

2. Apparatus according to claim 1 and wherein said guiding means comprises a pair of spaced guides mounted at each side of the bucket for operatively engaging said rollers, said guides having their outer end portions positioned to operatively engage said rollers on the hopper and tilt the bucket when the latter is raised toward and approaches load discharging position and having their inner ends positioned to disengage said rollers when the bucket is raised beyond said position.

3. Apparatus according to claim 1 and wherein said frame includes a bracket, said latch means being mounted on said bracket, and said bucket having a stud extending laterally therefrom in position to automatically engage and disengage said latch means when the bucket is tilted from and toward load discharging position.

4. Material handling apparatus wherein a bucket open at its top end and a hopper open at its top end are mounted in a hoisting tower with means including a hoisting cable for supporting and moving said bucket from and toward load receiving position and toward and from load discharging position in relation to said hopper, said bucket having spaced parallel main guides at its sides and being pivotally mounted for tilting toward and from load discharging position, wherein the improvement comprises tilting devices including rollers on the hopper arranged in the path of vertical movement of the bucket for operatively engaging said guides to tilt the bucket, stop means operatively arranged for limiting the extent of said tilting movement of the bucket, and latch means operatively positioned to releasably retain the bucket in its load receiving position and in its load discharging position.

5. Apparatus according to claim 4 and wherein said spaced parallel main guides include a long guide and a short guide on each side of the bucket, said guides being positioned to disengage from and by-pass the rollers on the hopper when the bucket is raised beyond its discharging position in relation to the hopper.

6. Apparatus according to claim 5 and wherein supplemental guides on the bucket are positioned adjacent to and spaced from inner end portions of the short guides to operatively engage said rollers when said spaced main guides are disengaged from said rollers, thereby to control upward movement of the bucket beyond its load discharging position and return movement thereof into re-engagement with said spaced main guides and toward loading position.

7. Apparatus according to claim 5 and wherein the bucket is provided with a laterally extending stop lug; and a spring biased stop latch is positioned to operatively engage said stop lug on the bucket when the latter is in discharging position.

References Cited

UNITED STATES PATENTS

| | | | |
|---|---|---|---|
| 1,168,947 | 1/1916 | Levalley | 214—704 |
| 1,299,261 | 4/1919 | Taylor | 214—705 |
| 1,833,915 | 12/1931 | Schmitt | 214—705 |

GERALD M. FORLENZA, Primary Examiner

R. B. JOHNSON, Assistant Examiner

U.S. Cl. X.R.

214—709